(12) United States Patent
Schek

(10) Patent No.: US 8,730,583 B2
(45) Date of Patent: May 20, 2014

(54) MICROSCOPE OBJECTIVE

(75) Inventor: Stefan Schek, Neckargemünd (DE)

(73) Assignee: Leica Microsystems CMS GmbH, Wetzlar (DE)

(*) Notice: Subject to any disclaimer, the term of this patent is extended or adjusted under 35 U.S.C. 154(b) by 0 days.

(21) Appl. No.: 13/543,511

(22) Filed: Jul. 6, 2012

(65) Prior Publication Data

US 2013/0010367 A1  Jan. 10, 2013

(30) Foreign Application Priority Data

Jul. 8, 2011  (DE) .......................... 10 2011 051 677

(51) Int. Cl.
*G02B 21/02* (2006.01)
(52) U.S. Cl.
USPC ........... 359/656; 359/657; 359/658; 359/659; 359/660; 359/661
(58) Field of Classification Search
USPC ......... 359/656–661, 376, 365, 694–701, 823, 359/834, 811
See application file for complete search history.

(56) References Cited

U.S. PATENT DOCUMENTS

| 6,292,221 | B1* | 9/2001 | Lichtman .................. 348/345 |
| 7,593,173 | B2 | 9/2009 | Harada et al. |
| 2006/0164721 | A1* | 7/2006 | Uhl et al. .................. 359/368 |
| 2010/0027109 | A1 | 2/2010 | Liebel et al. |

FOREIGN PATENT DOCUMENTS

| DE | 19541237 A1 | 5/1996 |
| DE | 10160587 A1 | 6/2003 |
| DE | 102007002863 B3 | 8/2008 |

* cited by examiner

*Primary Examiner* — Scott J Sugarman
*Assistant Examiner* — Mustak Choudhury
(74) *Attorney, Agent, or Firm* — Patentbar International, P.C.

(57) ABSTRACT

Described is a microscope objective (10, 100, 200) having an objective housing (12) which contains a lens system including a lens unit (60) capable of being moved along the optical axis (O) of the lens system to compensate for the thickness of the coverslip, and further having an adjusting device for adjusting the lens unit (60), said adjusting device including a drive unit (14, 102, 202) and a transmission (42, 44, 46, 48, 50, 52, 54, 56, 62) which is drivable by the drive unit (14, 102, 202) and coupled to the lens unit (60). According to the present invention, the drive unit (14, 102, 202) has a motor (34) and is mounted on the objective housing (12).

14 Claims, 12 Drawing Sheets

MICROSCOPE OBJECTIVE

RELATED APPLICATIONS

This application claims priority to German Patent Application No. 10 2011 051 677.8, filed Jul. 8, 2011, which is incorporated herein by reference in its entirety.

FIELD OF THE INVENTION

The present invention relates to a microscope objective having an objective housing which contains a lens system including a lens unit capable of being moved along the optical axis of the lens system to compensate for the thickness of the coverslip, and further having an adjusting device for adjusting the lens unit, said adjusting device including a drive unit and a transmission which is drivable by the drive unit and coupled to the lens unit. The lens unit may be either a single mounted lens or a lens element; i.e., a group of combined lenses.

BACKGROUND OF THE INVENTION

In light microscopy, the specimen located on a slide is often covered with a thin flat piece of transparent material (hereinafter simply referred to as "coverslip") before it is imaged by the microscope objective. For imaging purposes, preferably, an immersion medium is applied to the coverslip, and an objective known as immersion objective is used, the front lens of which is immersed in the immersion medium. This provides a higher numerical aperture, and thus a higher resolution. The imaging of the specimen by the microscope objective is influenced by the coverslip located in the imaging beam path according to the thickness thereof. Therefore, high-quality so-called "coverslip-corrected" microscope objectives frequently have an adjusting device which enables a lens unit provided for this purpose in the objective lens system to be adjusted along the optical axis according to the thickness of the coverslip being used, and to do so in such a way that the thickness of the coverslip is accurately taken into account in the optical imaging process, making it possible to obtain a precise image of specimen. The adjustment of this lens unit is usually in a range of a few μm.

Such a conventional adjusting device typically includes a manually operable correction ring, which is externally accessibly mounted on the objective housing and coupled to a transmission, which converts the rotational movement manually imparted to the correction ring into a corresponding linear movement of the lens unit that is intended for coverslip thickness correction, said linear movement being along the optical axis. When coverslips of different thickness are used for covering the specimens, this manual correction must be repeated for each new coverslip thickness. This is time-consuming and complicates the use of the microscope. An example of a manually operable adjusting device for coverslip thickness correction is described in DE 10 2007 002 863 B3.

A motorized adjusting device for coverslip thickness correction is known from U.S. Pat. No. 7,593,173 B2. This adjusting device has a drive motor which is mounted on an objective turret and the drive shaft of which can be coupled as desired to any of a plurality of microscope objectives carried on the objective turret. For this purpose, each of these microscope objectives has a correction ring of the type mentioned at the outset, which can be engaged with the motor shaft. Since this known adjusting device is intended to allow coupling to various microscope objectives, it is relatively difficult to make this coupling so precise that it will allow the desired high-accuracy coverslip thickness correction to be achieved. Also, the structure for engagement and disengagement of the motor mounted on the objective turret is relatively complex. In addition, the precise adjustment of the correction ring requires considerable practice and skill of the user.

SUMMARY OF THE INVENTION

It is an object of the present invention to provide a microscope objective having a simply constructed and precisely operating adjusting device for coverslip thickness correction.

In a microscope objective of the type specified at the outset, this object is achieved according to the present invention in that the drive unit has a motor and is mounted on the objective housing.

Unlike the prior art approaches, which typically employ manually operable correction rings, the present invention provides that the lens unit intended for coverslip thickness correction be adjusted along the optical axis by motor means. This significantly simplifies the use of the microscope and, in addition, provides the possibility of performing coverslip thickness correction in a fully automated way, for example, by suitably controlling the motor to adaptively adjust the position of the lens unit. This ensures that the microscope objective always provides the desired high image quality, regardless of the coverslip being used.

Because the drive unit included in the motor is mounted directly on the objective housing, the lens unit intended for coverslip thickness correction can be driven in a precise manner. In particular, the motor can be precisely coupled to the transmission which is connected to the lens unit and transmits the driving force of the motor to the lens unit. Since the drive unit and the objective housing, as it were, form one unit, objectives can be easily changed, for example, using an objective turret carrying a plurality of microscope objectives.

Preferably, the drive unit is mounted on the outside of the objective housing. In this case, the driving force generated outside the objective housing is transmitted. via the transmission coupled to the motor, into the objective housing, where it is transmitted to the lens unit intended for coverslip thickness correction.

In a preferred embodiment, the transmission includes a correction ring which is mounted on the objective housing and rotatable by the motor about the optical axis, and a force-transmitting mechanism which is disposed within the objective housing, coupled to the correction ring, and converts the rotational movement of the correction ring into an adjusting movement of the lens unit along the optical axis. In the case of this embodiment, a conventional microscope objective of the type described at the outset, which has a (heretofore manually operated) correction ring for coverslip thickness correction, can be easily retrofitted with the drive unit of the present invention to facilitate the desired motorized coverslip thickness correction. For this purpose, the motor has, for example, a drive shaft carrying a pinion, which meshes with the correction ring and thus converts the rotation of the motor into a rotational movement of the correction ring.

Preferably, the force-transmitting mechanism includes an objective sleeve which is non-rotatably coupled to the correction ring and has a cam face extending at least partially around the optical axis, and further includes a rolling-contact bearing which is mounted on the lens unit and, when the objective sleeve is rotated about the optical axis, rolls on the cam face and moves the lens unit along the optical axis. The function of the cam face in this process is to convert the rotational movement of the correction ring and the objective sleeve non-rotatably coupled thereto into the desired linear movement of the lens unit. For this purpose, the cam face has a slight slope when viewed in a direction perpendicular to the optical axis. This slope is selected such that a rotation of the correction ring, and thus of the objective sleeve, about the optical axis by a certain amount will cause the lens unit to be moved along the optical axis by a corresponding adjustment distance. The slope of the cam face may be selected, for example, such that the adjustment distance along the optical axis is in a range of several μm.

The force-transmitting mechanism preferably includes a biasing element which biases the rolling-contact bearing against the cam face. This ensures that the rolling-contact bearing always engages the cam face without play, whereby the lens unit is precisely moved along the optical axis.

In another advantageous embodiment, the drive unit has a drive housing which is mounted on the outside of the objective housing and which accommodates the motor, preferably in a waterproof manner to protect it against the immersion medium. In this case, preferably a rotary positioning device is provided which allows the drive housing to be rotated about the optical axis on the outside of the objective housing. The relative rotatability of the drive housing allows for flexible positioning of the drive unit on the objective housing. This is advantageous, for example, when the microscope objective is held on an objective turret which carries further objectives, because in this case, the objectives have to be mounted in a particularly space-saving manner.

Preferably, the rotary positioning device includes a holder to which the drive housing is attached and which is mounted on the outside of the objective housing such that it is stationary along the optical axis and rotatable thereabout. Thus, an existing microscope objective can be easily retrofitted with the drive unit of the present invention, for example, by providing a supporting ring which supports the drive housing containing the motor and which is mounted on the outside of the objective housing such that it is rotatable about the optical axis.

In another advantageous embodiment, the rotary positioning device has a disengagement mechanism for disengaging the motor from the transmission. The disengagement mechanism includes, for example, a linear guide which guides the motor in the drive housing in a direction parallel to the optical axis, and a disengagement lever which is attached to the motor and by which the motor can be moved between an engaged position, in which the motor is engaged with the transmission, and a disengaged position, in which the motor is disengaged from the transmission. In the engaged position, in which, for example, a pinion mounted on the shaft of the motor engages with the coupling ring, it is possible to perform the desired coverslip thickness correction. However, if the drive unit is to be rotated on the objective housing about the optical axis to a different position, then the motor can be disengaged from the transmission by operating the disengagement lever to carry out the desired positioning. In order to disengage the motor, it is moved within the drive housing in a direction parallel to the optical axis without moving the drive housing in this direction.

Preferably, the disengagement mechanism has a biasing element which biases the motor into the engaged position in the drive housing. Accordingly, in this embodiment, the motor is disengaged by moving it parallel to the optical axis against the biasing force exerted by the biasing element, and is then moved to the desired position together with the drive housing, after which it returns to an engaged position by itself.

Preferably, a clamping device is provided by which the holder can be locked to the outside of the objective housing in any rotational position about the optical axis. Such a clamping device allows the holder carrying the drive housing to be released from the outside of the objective housing and relocked thereto in a particularly simple way.

In an alternative embodiment, the drive unit is mounted within the objective housing. Mounting the drive unit within the objective housing allows for a particularly compact design of the microscope objective. In this case, the transmission, which converts the driving force of the motor into the linear movement of the lens unit, preferably takes the form of a particularly space-efficient worm gear drive. Regardless of whether the drive unit is mounted within or outside of the objective housing, it is possible to use as a motor a piezoelectric servomotor, an ultrasonic servomotor, or any other type of motor that has a particularly compact design.

Preferably, the objective housing is provided with electrical contacts for connecting the drive unit to a power supply unit and/or a control unit. This eliminates the need for disturbing cables, which would otherwise be needed for power supply to and control of the drive unit.

Alternatively, the microscope objective may also have a power supply unit and a radio receiving unit for wireless control of the drive unit. Controlling the drive unit by radio further facilitates the use of the microscope objective.

In a preferred embodiment, a cap is provided which surrounds the objective housing at the end facing the sample and is adapted to receive immersion liquid. Such a cap is described in detail, for example, in US 2010/0027109 A1.

The present invention further provides a microscope having at least one microscope objective of the type described hereinbefore.

Preferably, the microscope has a microscope turret carrying a plurality of microscope objectives according to the present invention.

BRIEF DESCRIPTION OF THE DRAWINGS

The present invention will now be described in greater detail with reference to the drawings, in which.

DETAILED DESCRIPTION OF THE PREFERRED EMBODIMENTS

In the following, a microscope objective 10 will be described as a first exemplary embodiment with reference to FIGS. 1 through 10. In the description, only those components of the microscope objective shown in FIGS. 1 through 10 are explained which are necessary for understanding the present invention.

Microscope objective 10 has an objective housing 12, on the outside of which is mounted a drive unit 14. As can be seen in particular in FIGS. 1 and 2, drive unit 14 has a drive housing 16 which accommodates the drive components of drive unit 14, which will be described in greater detail later herein.

Figure 4:
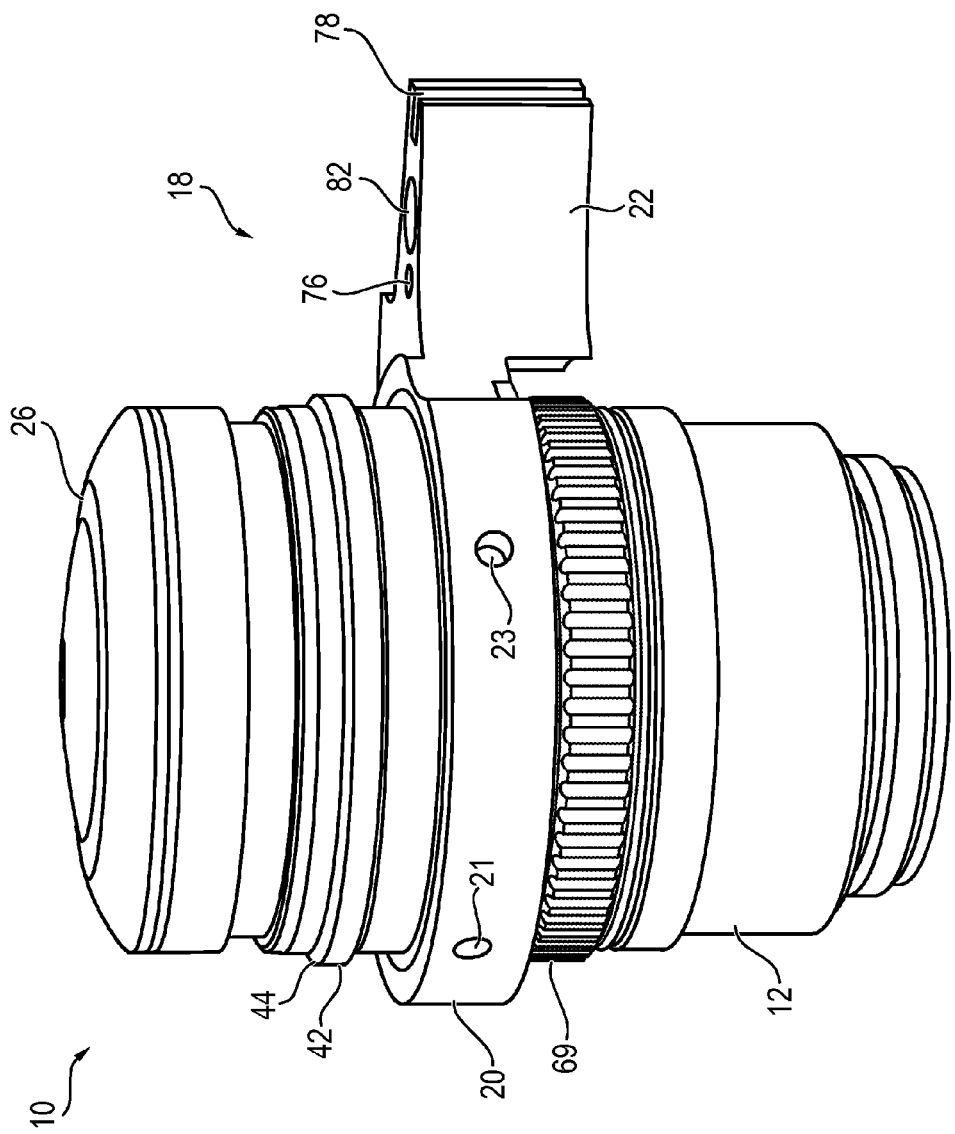
FIG. 4 is a perspective view of the microscope objective, in which a holder attached to the objective housing is shown without the drive unit.

Drive housing 16 is attached to objective housing 12 by a holder 18, which is shown in FIG. 4. Holder 18 includes an annular member 20 and a holding arm 22 adjoining said annular member 20. Holder 18 is mounted on objective housing 12 such that it is rotatable about an optical axis O (shown in FIG. 1) of microscope objective 10, but stationary along this optical axis O. For this purpose, annular member 20 is provided with threaded holes 21 and 23 into which set screws (not shown in FIG. 4) can be screwed to secure holder 18 to objective housing 12 in such a way that holder 18 can still be rotated about optical axis O.

Figure 1:
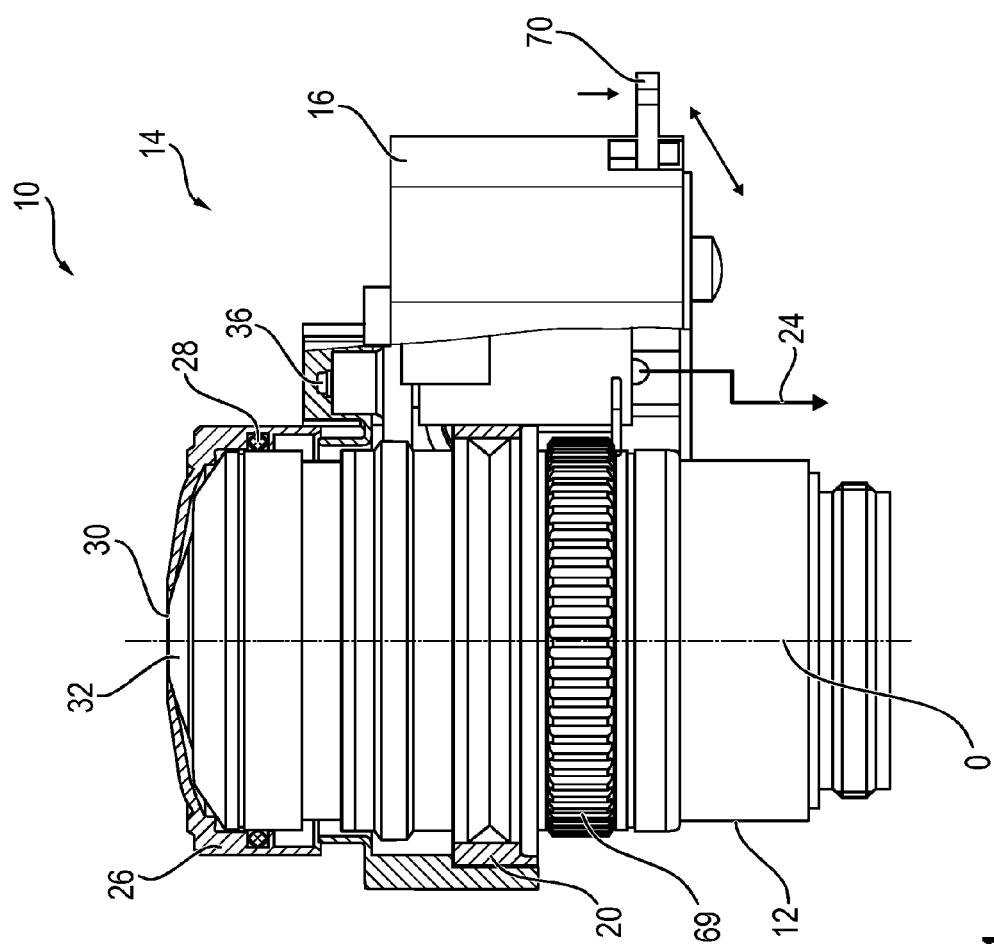
FIG. 1 is a partially cross-sectional side view of a microscope objective constituting a first exemplary embodiment.

Housing 16 of drive unit 14 is fixedly coupled to holder 18. As shown in FIG. 1, drive unit 14 is supplied with power and control signals via a cable 24. To this end, cable 24 is connected to a control/power supply unit (not shown in FIG. 1) of a microscope.

Figure 7:
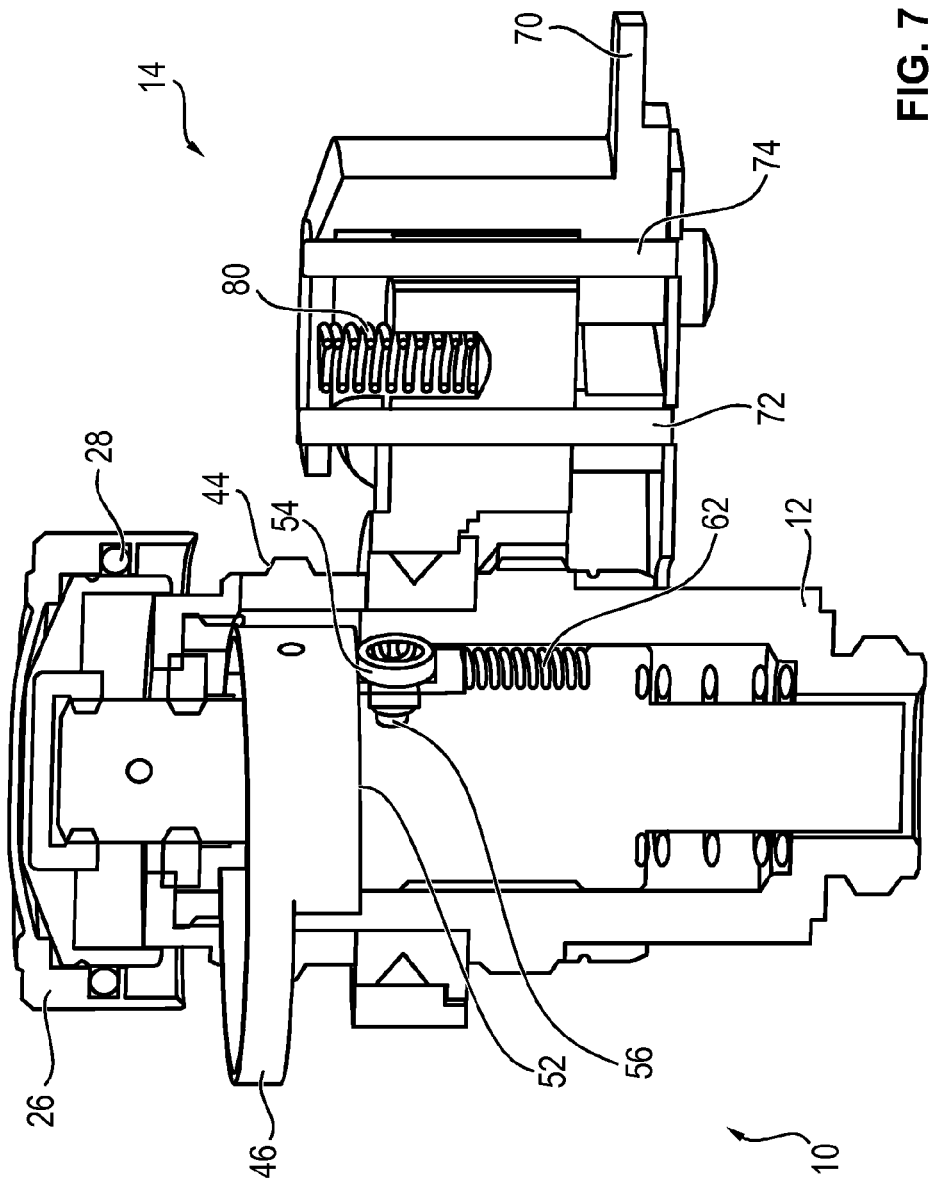
FIG. 7 is a cross-sectional view of the microscope objective, showing, in particular, parts of a mechanism for decoupling the drive unit.
Figure 8:
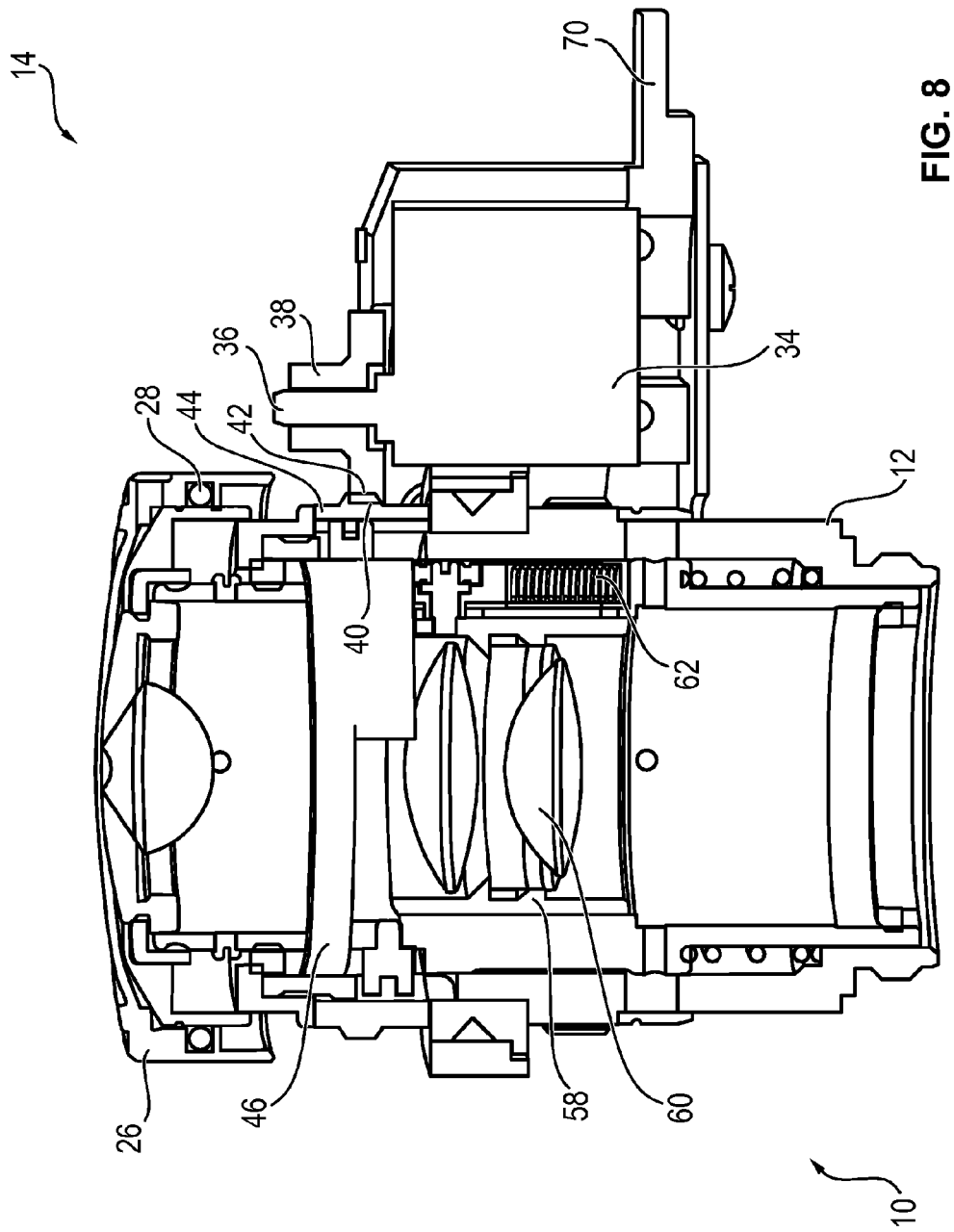
FIG. 8 is a cross-sectional view of the microscope objective, illustrating, in particular, the coupling of the drive unit to a coupling ring.

As can best be seen in FIGS. 1, 7 and 8, microscope objective 10 has a lens cap 26, which is resiliently mounted on the end of objective housing 12 facing the specimen to be imaged. As a result of this resilient mounting, lens cap 26 yields upon contact with the specimen (not shown in the figures), thereby protecting the specimen to a certain degree. Cap 26 is held to objective housing 12 via a sealing ring 28. Lens cap 26 has a central opening 30, which is located in the region of a lens 32 facing the specimen and forming part of a lens system contained in objective housing 12.

Cap 26 is adapted to receive an immersion liquid, which is supplied separately from outside. The function and design of cap 26 are described in detail in US 2010/0027109 A1.

Figure 5:
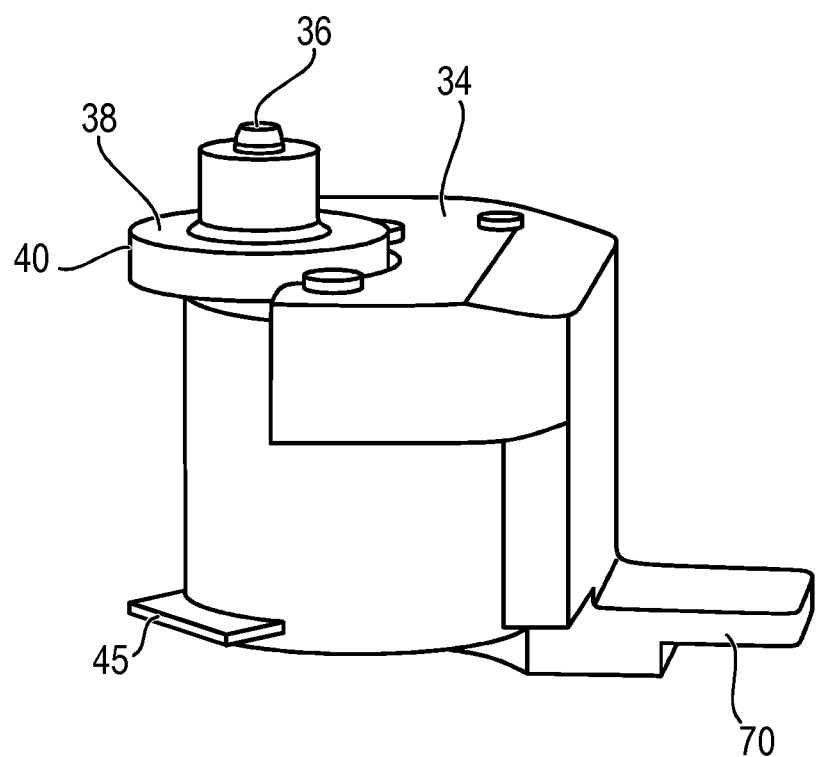
FIG. 5 is a perspective view of the motor provided in the drive unit.
Figure 6:
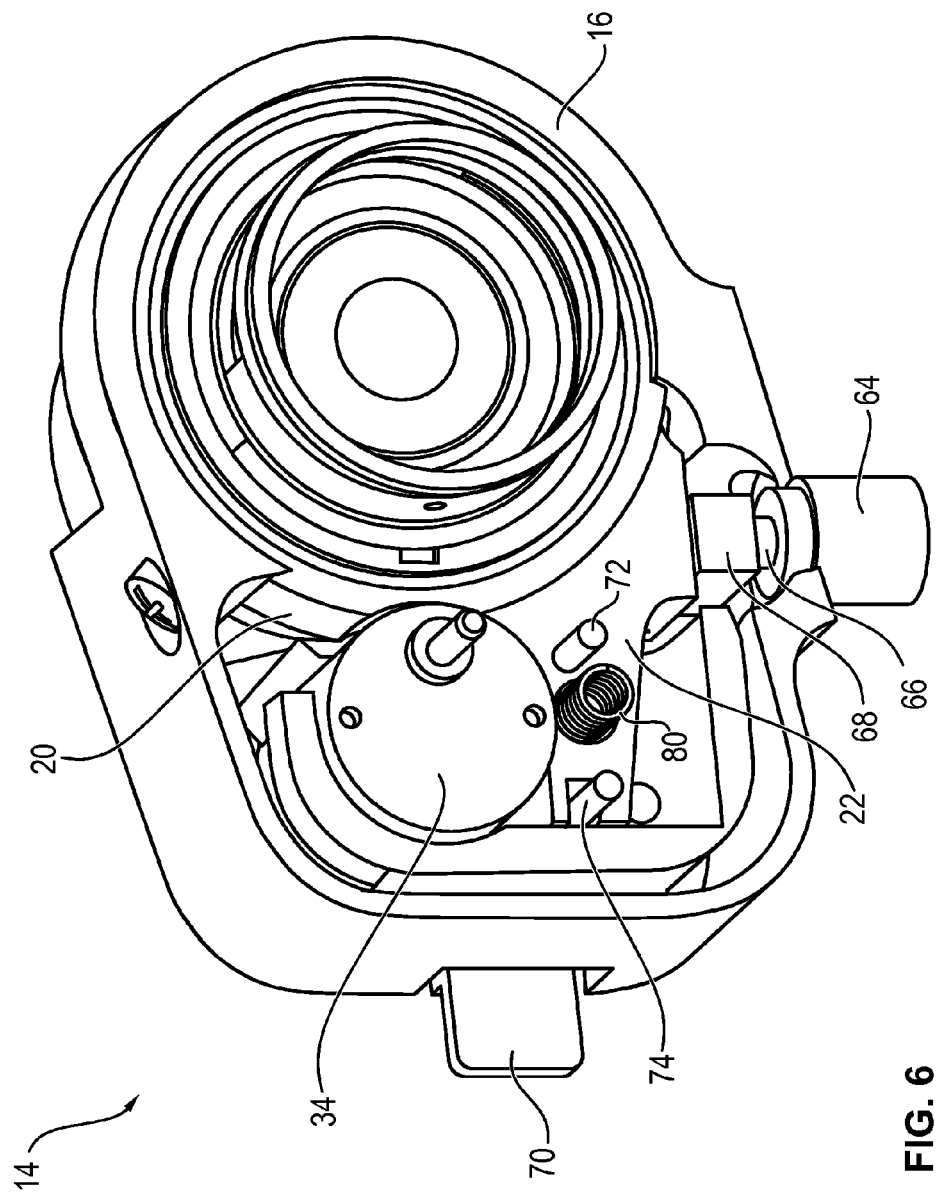
FIG. 6 is a perspective cross-sectional view of the microscope objective, showing, in particular, parts of a device for rotary positioning of the drive unit.

As shown, for example, in FIG. 6, drive housing 16 of drive unit 14 accommodates a motor 34. Motor 34 is also shown, for example, in FIG. 8, separately in FIG. 5, and in FIG. 3 with housing 16 omitted, except for a bottom member 35.

Motor 34 has a drive shaft 36 having a pinion 38 fixedly mounted thereon. Pinion 38 has a toothing 40, which meshes with a toothing 42 of a correction ring 44. Toothings 40 and 42 are not shown in detail in the figures. Correction ring 44 is mounted on objective housing 12 such that it is rotatable about optical axis O, as can be seen also in FIGS. 3, 4 and 9, for example. Rotation of motor shaft 36 causes correction ring 44 to be also rotated via the meshing toothings 40 and 42.

Figure 9:
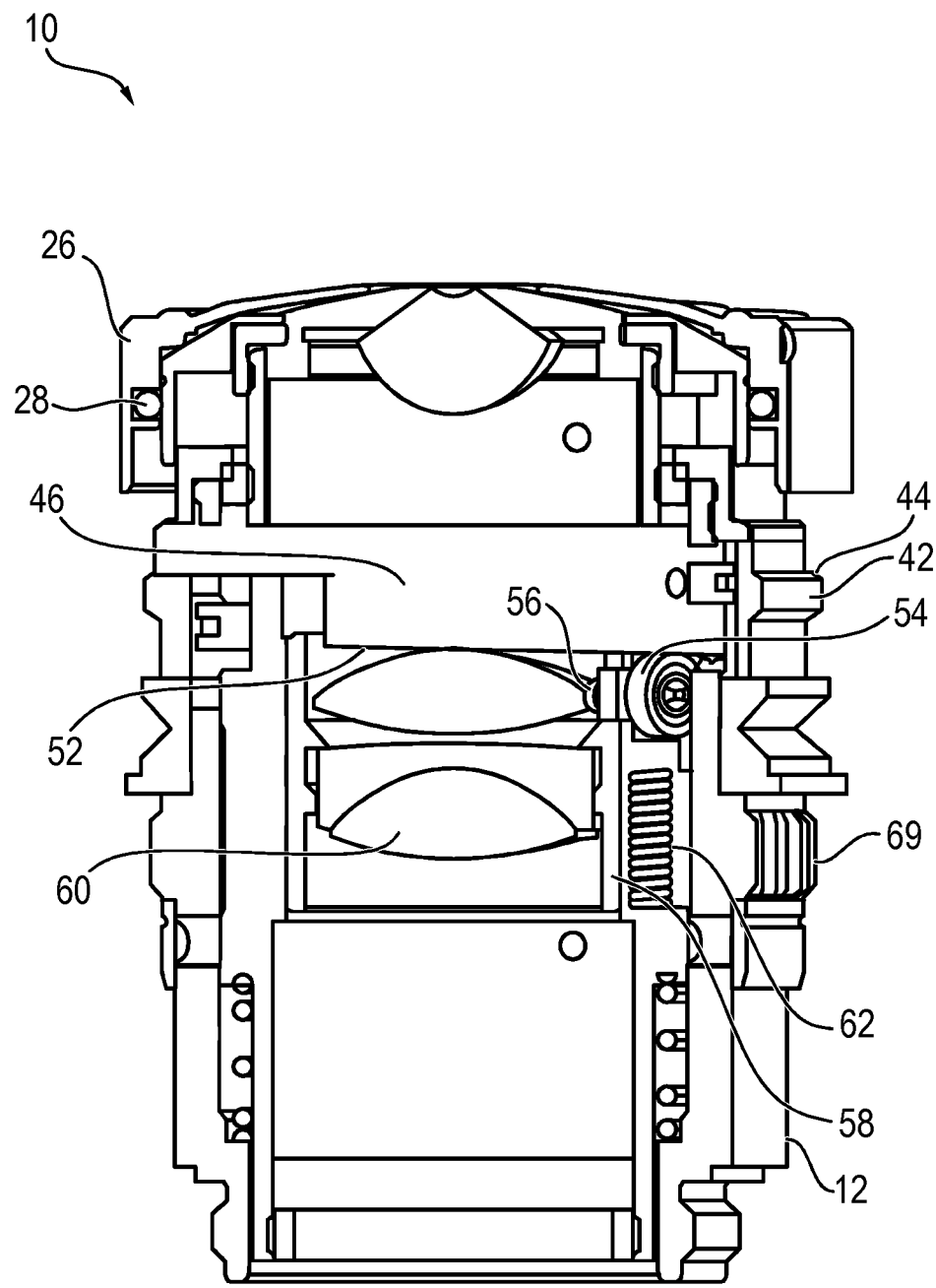
FIG. 9 is a partially cross-sectional perspective view showing, in particular, a force-transmitting mechanism for moving a lens unit intended for coverslip thickness correction.

As shown in FIG. 9, correction ring 44 is non-rotatably coupled to an inner objective sleeve 46. When correction ring 44 is rotated about optical axis O by the rotation of motor shaft 36, the correction ring causes objective sleeve 46 to rotate along with it.

Objective sleeve 46 has a cam face 52 extending partially around optical axis O and having a slight slope when viewed in a direction perpendicular to optical axis O. An annular rolling element 54 mounted by a screw 56 to a lens mount 58 engages cam face 52. Held in lens mount 58 is a lens 60 which, in the lens system of microscope objective 10, is the lens unit that is moved along optical axis O for purposes of coverslip thickness correction in accordance with the present invention. Lens mount 58 is also acted upon by a spring 62, which presses rolling element 54 against cam face 52.

The aforedescribed components 46, 52, 54, 56, 58 and 62 constitute a force-transmitting mechanism which serves to convert a rotational movement of correction ring 44 about optical axis O into a movement of lens 60 along optical axis O which will effect the coverslip thickness correction. The distance along optical axis O through which lens 60 is moved when correction ring 44 is rotated by a certain amount is determined by the slope of cam face 52. As indicated in FIG. 9, the aforementioned slope of cam face 52 is so small that a rotation of correction ring 44 by a relatively large amount causes lens 60 to be moved only through a small adjustment distance along optical axis O. This adjustment distance will typically be in the range of a few µm.

As shown in FIG. 5, motor 34 further includes a terminal 45 for connection to cable 24, which is shown in FIG. 1.

Figure 2:
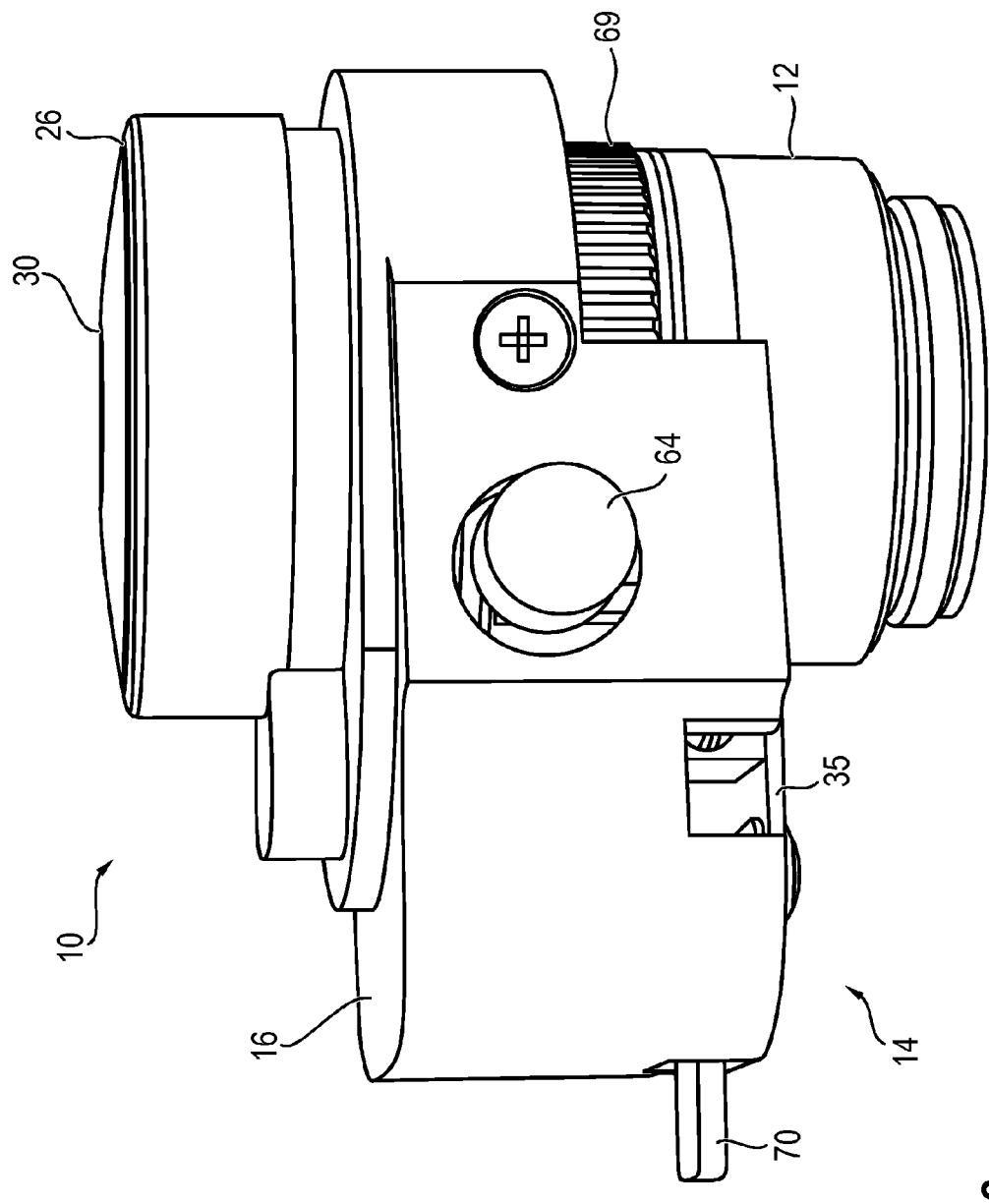
FIG. 2 is a perspective view of the microscope objective, showing, in particular, a drive unit.

In the present exemplary embodiment, drive unit 14 and holder 18, to which drive housing 16 of drive unit 14 is attached, can be rotated together about optical axis O and locked in any rotational position. As shown in FIGS. 2 and 6, a manually operable clamping screw 64 is provided for this purpose. As shown only in FIG. 6, clamping screw 64 has a shank 66 which is moved into contact with a clamping block 68 by rotating clamping screw 64. When screw shank 66 is pressed against clamping block 68 by rotating clamping screw 64, clamping block 68 is in turn pressed against a screw-in ring 69, which is non-rotatably; i.e., fixedly connected to objective housing 12. Thus, in this state, drive unit 14 is locked in position on objective housing 12 together with holder 18. By loosening clamping screw 64, holder 18 is released, so that drive unit 14 and holder 18 can be rotated together about optical axis O.

In order to be able to rotate drive unit 14 in the aforedescribed manner about optical axis O on the outside of the objective housing, it is necessary to first disengage motor 34 from correction ring 44. To this end, pinion 38 of motor 34 must be disengaged from correction ring 44. For this purpose, motor 34 is provided with a disengagement lever 70, which is shown, inter alia, in FIG. 5, where drive housing 16 has been omitted.

In order to disengage motor 34 from coupling ring 44, disengagement lever 70 is pressed down in a direction parallel to optical axis O. This causes motor 34 and pinion 38 to move down parallel to optical axis O, thereby disengaging pinion 38 downwardly from coupling ring 44. Since drive housing 16 is fixedly mounted on holder 18, and thus is stationary in a direction parallel to optical axis O, depression of disengagement lever 70 causes motor 34 to move down parallel to optical axis O within drive housing 16.

As can be seen in the view of FIG. 7, drive unit 16 contains a linear guide in the form of two parallel guide pins 72 and 74, which extend parallel to optical axis O and which guide motor 34 parallel to optical axis O during its disengagement movement. Guide pin 72 is held in a pin receptacle 76, and guide pin 74 is held in a pin receptacle 78, said pin receptacles being formed in holding arm 22 of holder 18, as shown in FIG. 4.

Figure 3:
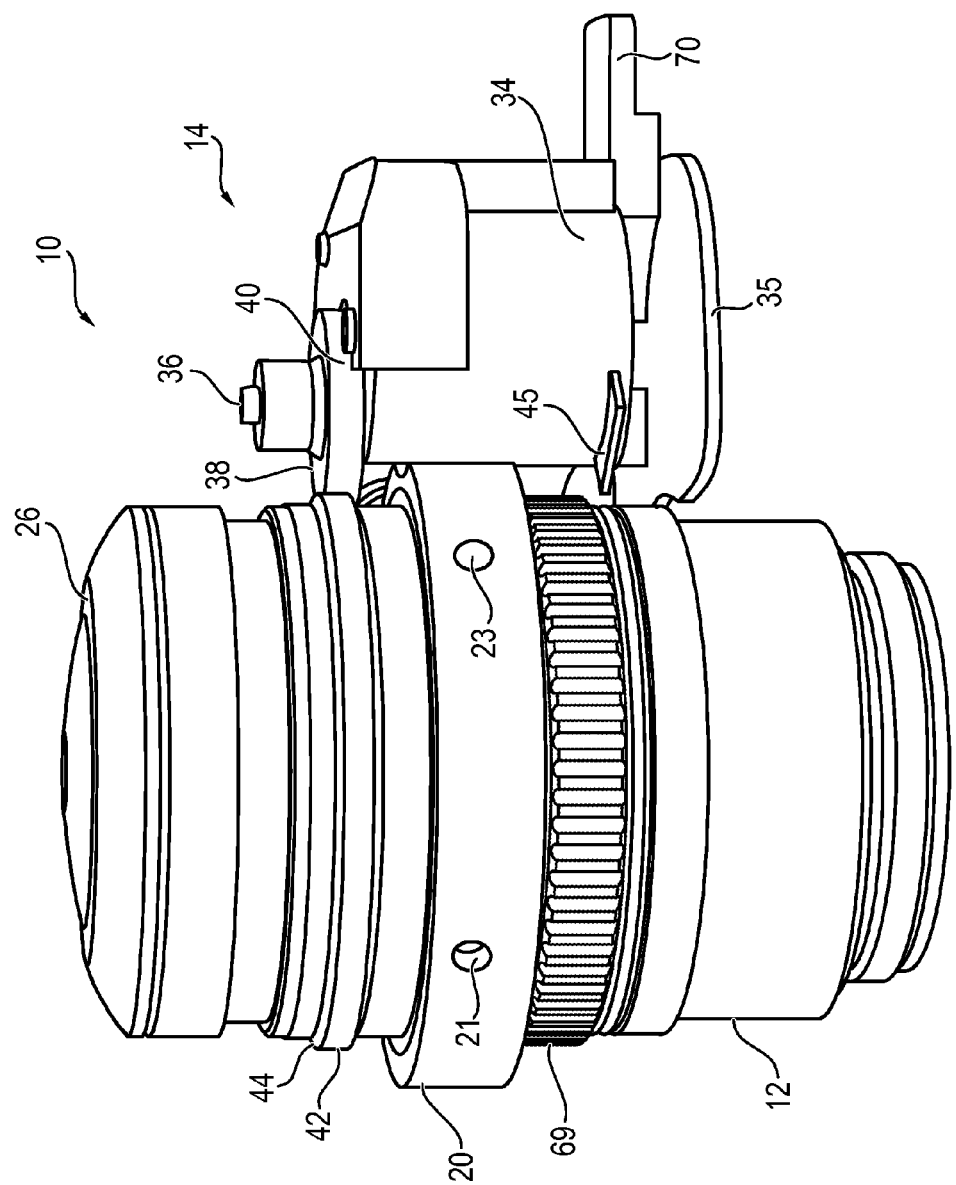
FIG. 3 is a perspective view of the microscope objective, showing the drive unit without the drive housing.

FIG. 7 further shows a spring 80, which biases motor 34 into the engaged position shown in FIG. 3, in which pinion 38 meshes with coupling ring 44. The depression of the disengagement lever 70 is performed against the biasing force exerted by spring 80. As shown in FIG. 4, spring 80 is received in a spring receptacle 82 formed in holding arm 22 of holder 18. Similar to guide pins 72 and 74, spring 80 is also oriented parallel to optical axis O, as can be seen also in FIG. 6. Spring 80 is clamped in drive housing 16 between two components, one of which is stationary in a direction along optical axis O, while the other is movable together with drive motor 34 in a direction along optical axis O.

Thus, in order to rotate drive unit 14 on the outside of the objective housing, first clamping screw 64 is loosened, and then disengagement lever 70 is pressed down parallel to optical axis O to move motor 34 down within housing 16 against the biasing force exerted by spring 80, whereby pinion 38 is disengaged from coupling ring 44. With disengagement lever 70 depressed, drive housing 16 is then rotated through the desired angle about optical axis O. Once drive housing 16 reaches the target position, disengagement lever 70 is released, whereupon the biasing force exerted by spring 80 moves motor 34 upward parallel to optical axis O within drive housing 16, thereby causing pinion 38 to mesh with coupling ring 44 again. Finally, clamping screw 64 is tightened.

Figure 10:
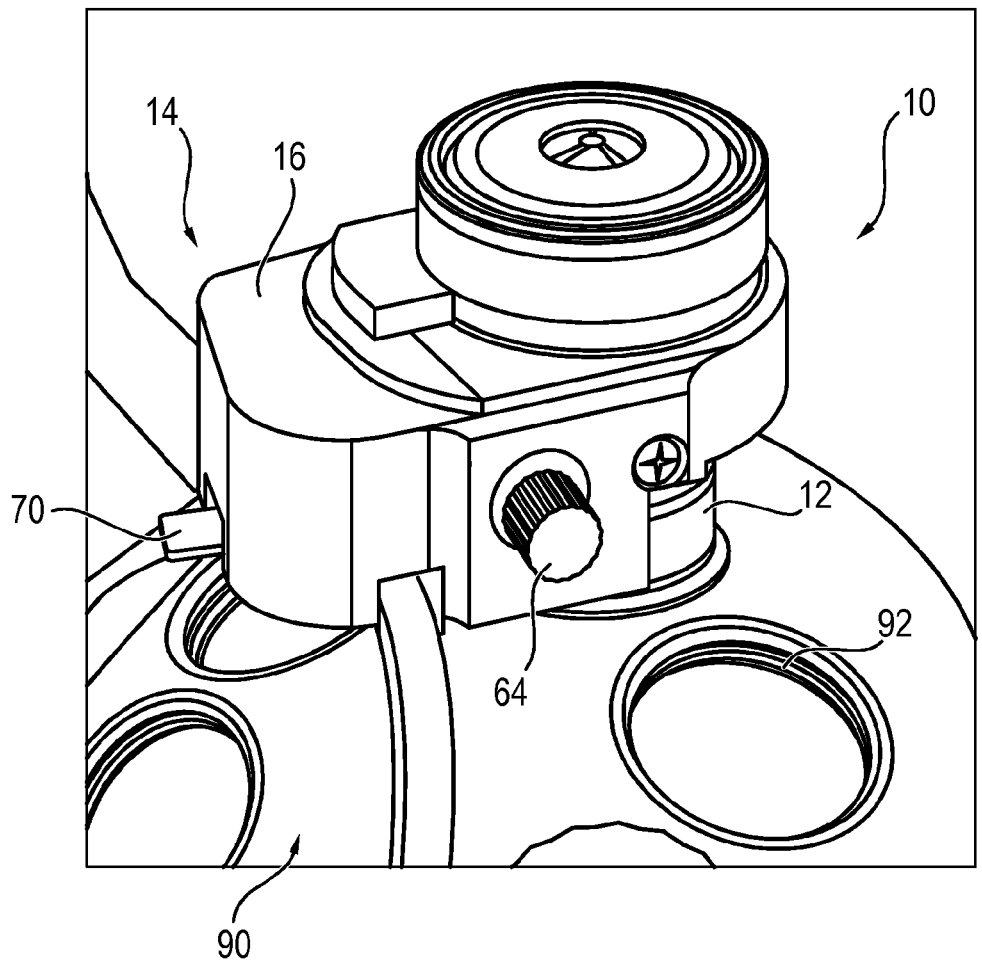
FIG. 10 is a perspective view showing the microscope objective mounted on an objective turret.

FIG. 10 illustrates how microscope objective 10 is mounted on an objective turret 90. Objective turret 90 has a plurality of threaded apertures 92, into which microscope objective 10 may be screwed. In example shown in FIG. 10, objective turret 90 is equipped with only one objective. However, it is understood that a plurality of objectives of the aforementioned type can be mounted on objective turret 90.

The microscope objective 10 described above and shown in FIGS. 1 through 10 is merely an exemplary embodiment of the present invention, which may be modified in many ways. Merely by way of example, reference is made here to embodiments in which the motor drive unit is not located outside of, but within the objective housing. Such embodiments are illustrated in FIGS. 11 and 12.

Figure 11:
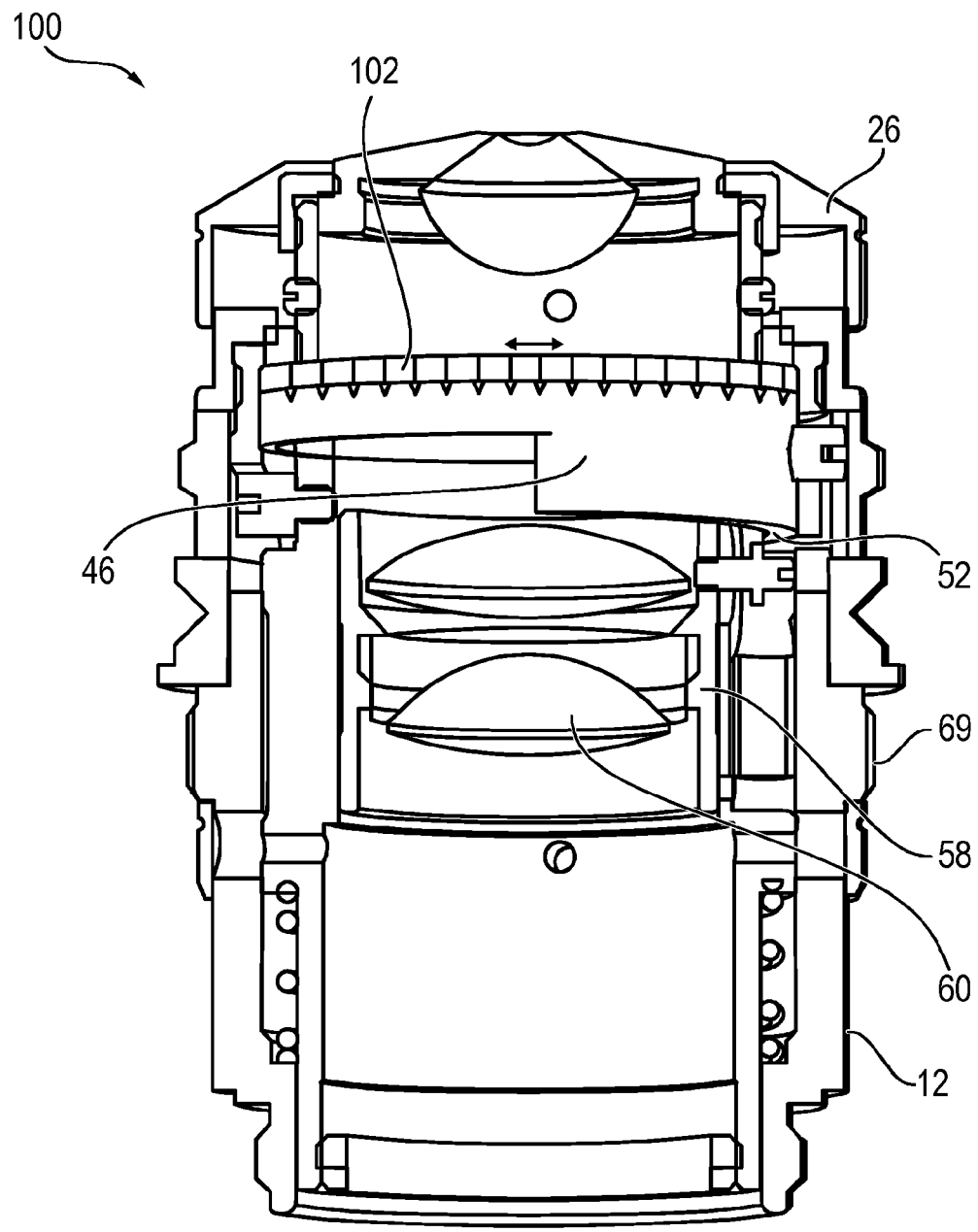
FIG. 11 is a partially cross-sectional side view of a microscope objective constituting a second exemplary embodiment.

FIG. 11 shows a microscope objective 100 which is modified from the embodiment shown in FIGS. 1 through 10 in that drive unit 14 provided on the outside of objective housing 12 is replaced by a ring-shaped ultrasonic motor 102 which is disposed within objective housing 12. Ultrasonic motor 102 acts on objective sleeve 46 from above to rotate it about optical axis O for purposes of coverslip thickness correction. In this embodiment as well, cam face 52 of objective sleeve 46 is used for transmitting force to lens mount 58 in order to move lens 60 along optical axis O. With regard to this force transmission, the exemplary embodiment shown in FIG. 11 has the same components as the exemplary embodiment shown in FIG. 9, these components including, in particular, rolling element 54, screw 56 and spring 62. These components are not depicted in FIG. 11, which is a different cross-sectional view than that shown in FIG. 9.

Figure 12:
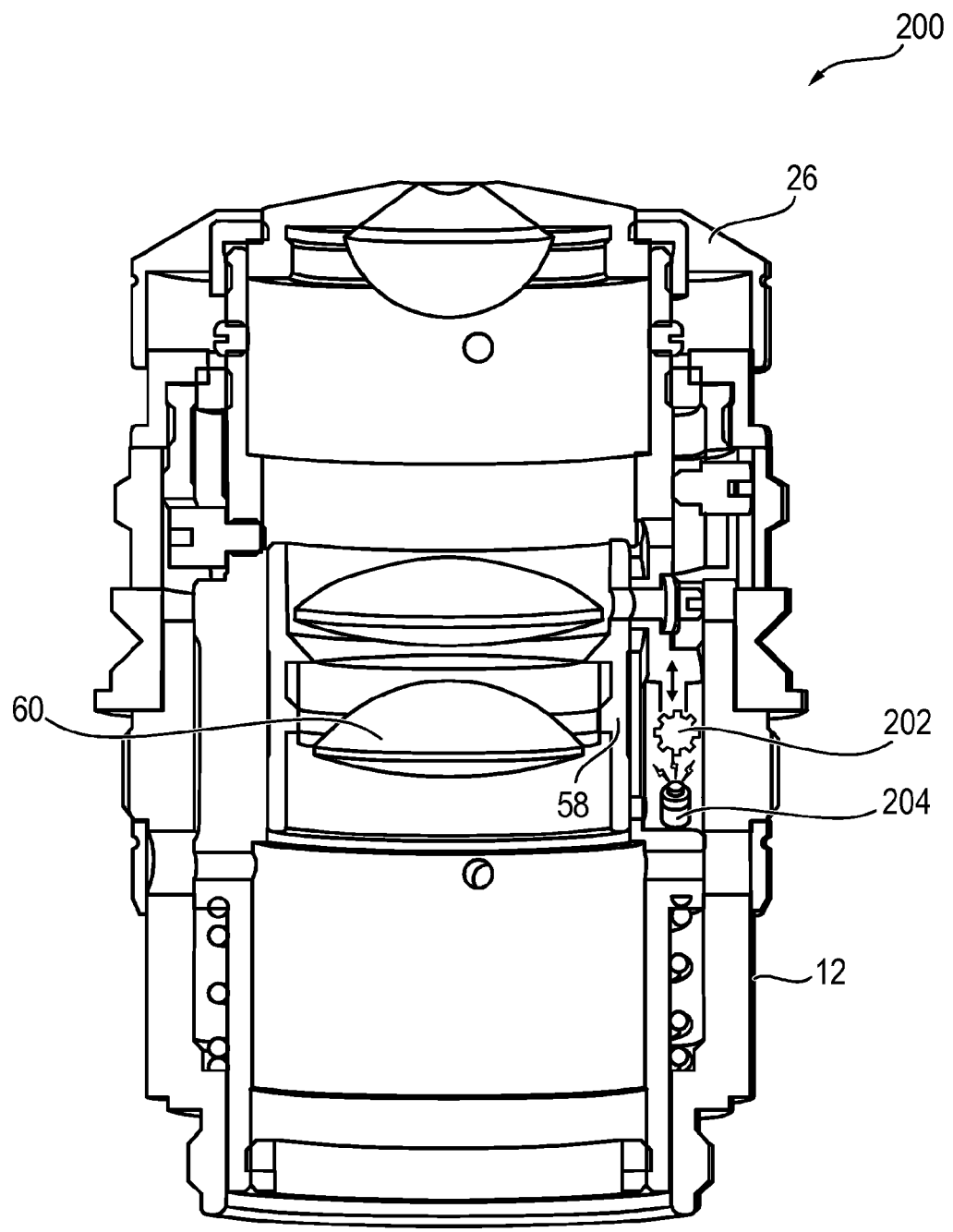
FIG. 12 is a partially cross-sectional side view showing a modification of the second exemplary embodiment.

FIG. 12 shows a microscope objective 200 as a further exemplary embodiment. Microscope objective 200 is modified from the exemplary embodiment shown in FIG. 11 in that ultrasonic motor 102 and the components driven by it, namely objective sleeve 46 with its cam face 52, rolling element 54, screw 56, and spring 62, are replaced by a micromotor 202 such as, for example, a piezoelectric servomotor, which drives lens mount 58 directly. Furthermore, a supply unit equipped with a battery and a radio receiver for wireless control of drive unit 202 is disposed within objective housing 12. This supply unit is generally designated 204 in FIG. 12.

It is understood that a unit corresponding to supply unit 204 may also be used in the exemplary embodiments described above.

What is claimed is:

1. A microscope objective comprising:
    an objective housing which contains a lens system including a lens unit capable of being moved along an optical axis of the lens system to compensate for a thickness of a coverslip; and
    an adjusting device which is provided for moving and adjusting the lens unit along the optical axis and includes a drive unit and a transmission which is drivable by the drive unit and coupled to the lens unit
    wherein the drive unit has a drive housing which is mounted on an outside of the objective housing and which accommodates a motor, and wherein a rotary positioning device is attached to both the drive housing and the objective housing to rotate the drive housing about the optical axis along the outside of the objective housing.

2. The microscope objective as recited in claim 1, wherein the transmission comprises a correction ring which is mounted on the objective housing and rotatable by the motor about the optical axis, and a force-transmitting mechanism which is disposed within the objective housing, coupled to the correction ring, and converting the rotational movement of the correction ring into an adjusting movement of the lens unit along the optical axis.

3. The microscope objective as recited in claim 2, wherein the force-transmitting mechanism comprises an objective sleeve which is non-rotatably coupled to the correction ring and has a cam face extending at least partially around the optical axis, and a rolling-contact bearing which is mounted on the lens unit and, when the objective sleeve is rotated about the optical axis, the bearing rolls on the cam face and moves the lens unit along the optical axis.

4. The microscope objective as recited in claim 3, wherein the force-transmitting mechanism comprises a biasing element which biases the rolling-contact bearing against the cam face.

5. The microscope objective as recited in claim 1, wherein the drive housing comprises a waterproof enclosure for the motor.

6. The microscope objective as recited in claim 1, wherein the rotary positioning device comprises a holder to which the drive housing is attached and which is mounted on the outside of the objective housing.

7. The microscope objective as recited in claim 1, wherein the rotary positioning device has a disengagement mechanism for disengaging the motor from the transmission.

8. The microscope objective as recited in claim 7, wherein the disengagement mechanism comprises a linear guide, which guides the motor in the drive housing in a direction parallel to the optical axis, and a disengagement lever which is attached to the motor and by which the motor can be moved between an engaged position, in which the motor is engaged with the transmission, and a disengaged position, in which the motor is disengaged from the transmission.

9. The microscope objective as recited in claim 7, wherein the disengagement mechanism has a biasing element which biases the motor into the engaged position in the drive housing.

10. The microscope objective as recited in claim 6, further comprising a clamping device by which the holder can be locked to the outside of the objective housing in a rotational position about the optical axis.

11. The microscope objective as recited in claim 1, wherein the drive unit is mounted within the objective housing.

12. The microscope objective as recited in claim 1, wherein the objective housing is provided with electrical contacts for connecting the drive unit to a power supply unit and/or a control unit.

13. The microscope objective as recited in claim 1, further comprising a supply unit comprising an energy storage device and a radio receiver for controlling the drive unit.

14. The microscope objective as recited in claim 1, further comprising a cap which surrounds the objective housing at an end facing a sample, said cap adapted to receive immersion liquid.

\* \* \* \* \*